(12) United States Patent
Sugano et al.

(10) Patent No.: US 12,208,511 B2
(45) Date of Patent: Jan. 28, 2025

(54) GRIPPING APPARATUS FOR PLATE-SHAPED WORKPIECE AND GRIPPING METHOD FOR PLATE-SHAPED WORKPIECE

(71) Applicant: DENSO WAVE INCORPORATED, Aichi-Pref. (JP)

(72) Inventors: Atsuko Sugano, Chita-gun (JP); Yohei Ota, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 857 days.

(21) Appl. No.: 17/344,074

(22) Filed: Jun. 10, 2021

(65) Prior Publication Data

US 2021/0387356 A1 Dec. 16, 2021

(30) Foreign Application Priority Data

Jun. 16, 2020 (JP) ................................ 2020-103774

(51) Int. Cl.
*B25J 15/00* (2006.01)
*B25J 9/16* (2006.01)

(52) U.S. Cl.
CPC ......... *B25J 15/0014* (2013.01); *B25J 9/1612* (2013.01); *B25J 9/1697* (2013.01); *B25J 15/0004* (2013.01)

(58) Field of Classification Search
CPC .... B25J 15/0014; B25J 9/1612; B25J 9/1697; B25J 15/0004; B25J 9/0096; B25J 9/1687; B25J 19/023; B25J 9/0093; B25J 13/08; B25J 15/00; B25J 19/02; B25J 19/04; B65G 47/1421
See application file for complete search history.

(56) References Cited

U.S. PATENT DOCUMENTS

| 4,960,195 A | 10/1990 | Yamaguchi et al. |
| 10,625,888 B2 * | 4/2020 | Takeuchi ............. H05K 13/021 |
| 11,660,746 B2 * | 5/2023 | Osaka ..................... B25J 9/1633 |
| | | 700/228 |
| 2009/0050644 A1 | 2/2009 | Yuyama et al. |
| 2015/0056053 A1 * | 2/2015 | Sano ..................... H05K 13/028 |
| | | 414/755 |
| 2018/0215035 A1 * | 8/2018 | Ono ........................ B25J 9/044 |

(Continued)

FOREIGN PATENT DOCUMENTS

| JP | S60-213615 A | 10/1985 |
| JP | S60-242116 A | 12/1985 |

(Continued)

*Primary Examiner* — Adam R Mott
*Assistant Examiner* — Ricardo I Viscarra
(74) *Attorney, Agent, or Firm* — Oliff PLC

(57) ABSTRACT

A gripping apparatus includes a tray, a detector, a robot, and a controller. The tray has a placement surface on which multiple workpieces of plate shape are to be placed. The placement surface is provided with multiple recesses. The detector is configured to detect arrangement of the workpieces placed on the tray. The robot is attached with a hand. The controller is configured to move and insert the workpieces into the recesses by vibrating the tray, specify the workpieces in a standing state with the detector, and instruct the robot to grip one of the workpieces in the standing state with the hand in a predetermined direction.

10 Claims, 12 Drawing Sheets

(56) References Cited

U.S. PATENT DOCUMENTS

| | | | |
|---|---|---|---|
| 2019/0276173 A1* | 9/2019 | Takeuchi | H01L 21/67333 |
| 2019/0383902 A1* | 12/2019 | Yeo | G01S 7/35 |
| 2020/0283242 A1* | 9/2020 | Osaka | B25J 9/1633 |

FOREIGN PATENT DOCUMENTS

| | | |
|---|---|---|
| JP | H02-47044 U | 3/1990 |
| JP | H04-196398 A | 7/1992 |

* cited by examiner

GRIPPING APPARATUS FOR PLATE-SHAPED WORKPIECE AND GRIPPING METHOD FOR PLATE-SHAPED WORKPIECE

CROSS REFERENCE TO RELATED APPLICATION

The present application claims the benefit of priority from Japanese Patent Application No. 2020-103774 filed on Jun. 16, 2020. The entire disclosure of the above application is incorporated herein by reference.

TECHNICAL FIELD

The present disclosure relates to a gripping apparatus for plate-shaped workpiece and a gripping method for a plate-shaped workpiece.

BACKGROUND

When performing a work using a robot, it may be necessary to align directions of workpieces to be worked.

SUMMARY

The present disclosure provides a gripping apparatus and a gripping method using the gripping apparatus. A gripping apparatus includes a tray, a detector, a robot, and a controller. The tray has a placement surface on which multiple workpieces of plate shape are to be placed. The placement surface is provided with multiple recesses. The detector is configured to detect arrangement of the workpieces placed on the tray. The robot is attached with a hand. The controller is configured to move and insert the workpieces into the recesses by vibrating the tray, specify the workpieces in a standing state with the detector, and instruct the robot to grip one of the workpieces in the standing state with the hand in a predetermined direction.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

As workpieces to be worked, some workpieces, such as tablets, may be placed basically in any direction. However, other workpieces may be formed into, for example, plate shape, and directions of the workpieces when attached to objects may be predetermined. Further, such workpieces may be relatively small.

When multiple plate-shaped workpieces are supplied to a tray in a so-called batch manner, because of their thin thickness, it is considered that the workpieces are basically in a flat state with the thickness direction generally along a vertical direction.

In this case, it is conceivable that the workpieces are respectively assembled to the objects by suctioning and picking up the workpieces in the flat state, for example. However, depending on a size of a suction pad and a magnitude of a suction force, it may be difficult to assemble the suctioned workpiece to the object as it is.

Further, for example, when it is desired to assemble the workpiece in a predetermined direction, it is conceivable that the workpiece in the flat state is picked up from the tray, temporarily placed, and then re-gripped in the predetermined direction. However, in that case, it is necessary to take a long time to work, to provide multiple hands, to provide a temporary storage place, and the like.

According to an aspect of the present disclosure, a gripping apparatus includes a tray, a detector, a robot, and a controller. The tray is capable of being vibrated and has a placement surface on which multiple workpieces of plate shape are to be placed. The placement surface is provided with multiple recesses. The recesses are configured to cause the workpieces placed on the tray to be in a standing state with respect to the placement surface. The detector is configured to detect arrangement of the workpieces placed on the tray. The robot is attached with a hand configured to grip one of the workpieces. The controller is configured to control the robot and vibration of the tray.

The controller is further configured to move and insert the workpieces into the recesses by vibrating the tray, specify the workpieces in the standing state with the detector, and instruct the robot to grip one of the workpieces that are specified with the hand in a predetermined direction.

According to the above configuration, the gripping apparatus can vibrate the tray to align the workpieces, which are considered to be basically placed flat because of their thin thickness, in the standing state on the placement surface, and can grip one of the workpieces in the standing state in the predetermined direction.

Therefore, the gripping apparatus can grip the workpiece with one hand in the predetermined direction. Further, since the multiple recesses are provided, the work efficiency can be improved.

Figure 1:
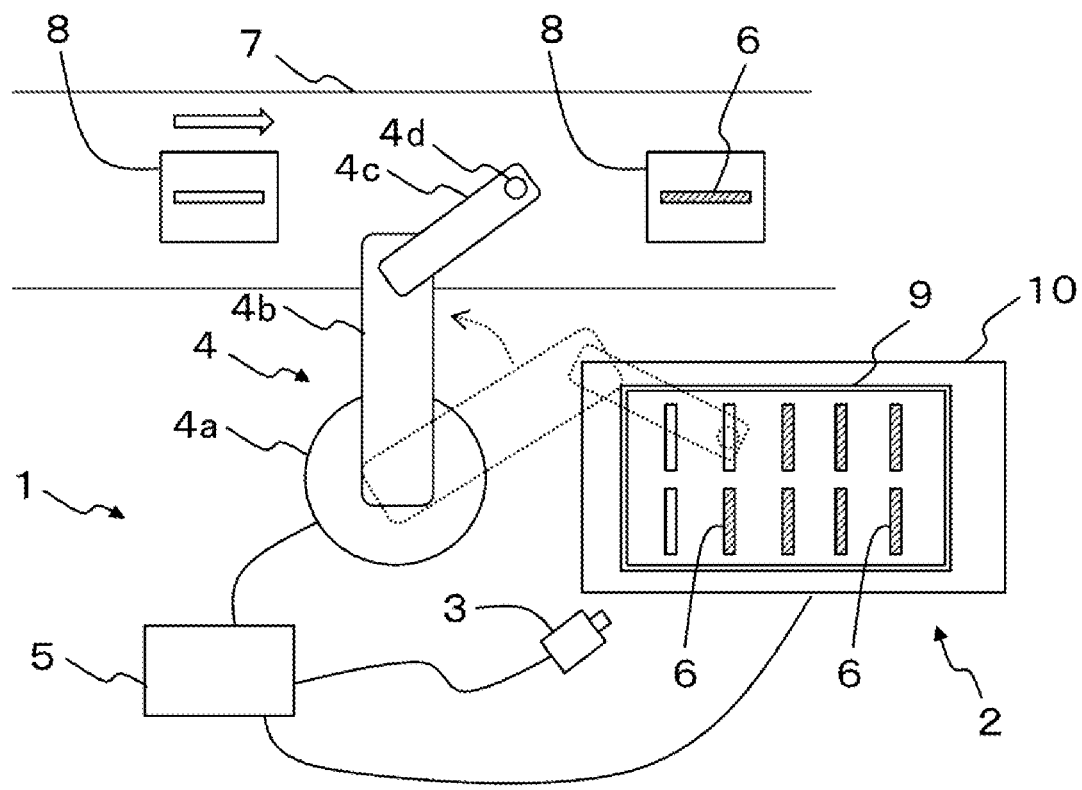
FIG. 1 is a diagram schematically showing a configuration of a gripping apparatus according to an embodiment.

The following describes an embodiment with reference to the drawings. As shown in FIG. 1, a gripping apparatus 1 of the present embodiment includes a feeder 2, a camera 3 as a detector, a robot 4, and a controller 5. The gripping apparatus 1 performs a work of assembling a work piece supplied from the feeder 2 to, for example, an object 8 conveyed by a line 7.

The feeder 2 includes a tray 9 and a vibration mechanism 10 that vibrates the tray 9. The vibration mechanism 10 is controlled by the controller 5. Multiple workpieces 6 can be placed on the tray 9 at a time, and the workpieces 6 can be supplied to the tray 9, for example manually or automatically supplied from a supply device (not shown). In FIG. 1, the workpieces 6 are hatched for the sake of explanation.

The camera 3 has an image capturing element such as a charge-coupled device (CCD) sensor or a complementary metal oxide semiconductor (CMOS) sensor, and captures an image of the workpieces 6 placed on the tray 9 and transmits the image to the controller 5. The camera 3 is installed at a position above the tray 9 so that the image of the workpieces 6 placed on the tray 9 can be captured. By fixing the position of the camera 3 in this way, the workpieces 6 can be recognized while the robot 4 is assembling one of the workpieces 6, and a cycle time can be shortened. However, the camera 3 may also be installed on the robot 4 so that the position of the camera 3 changes according to the change in the posture of the robot 4.

The detector is not limited to the camera 3, and a sensor, such as a laser sensor (not shown), capable of detecting the height difference and recognizing the shape of the workpiece 6 can be adopted if the sensor can recognize that the workpiece 6 is supplied in a predetermined direction. For example, a laser range finder can be used as the detector to detect whether or not the workpiece 6 is in a standing state. In that case, it is possible to determine whether the workpiece 6 is in the standing state by irradiating each recess 13 with a laser light and measuring a time until a reflected light is returned. In the present embodiment, a laser light is irradiated to multiple portions near an upper end of the workpiece 6, and if the reflected light is not detected at the position corresponding to a notch and the reflected light is detected on the side without the notch, the direction of the workpiece 6 can be determined.

Figure 2:
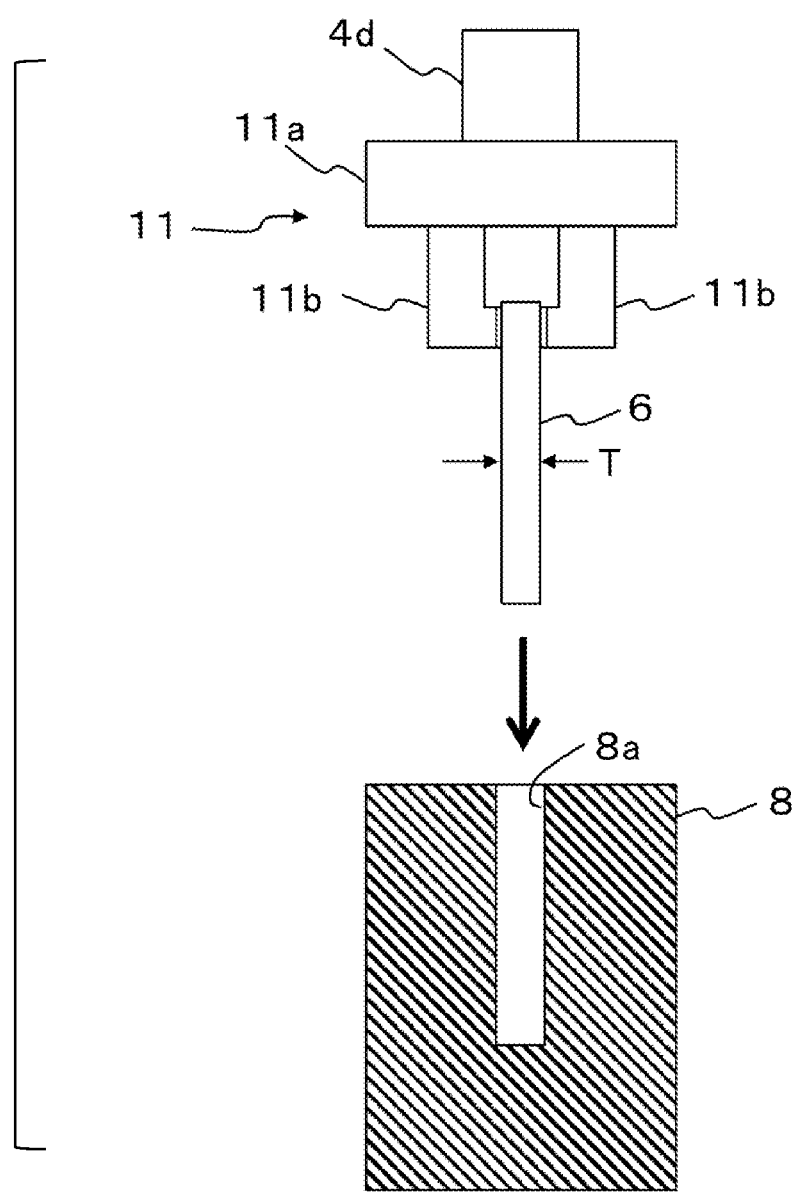
FIG. 2 is a diagram schematically showing a mode of gripping and assembling a workpiece with a hand.

In the present embodiment, the robot 4 is assumed to be a so-called 4-axis robot of a horizontal articulated type. The robot 4 has a base 4a installed on an installation surface, a first arm 4b that is rotatable around the base 4a, a second arm 4c that is rotatable relative to the first arm 4b, and a shaft 4d that is provided at a tip of the second arm 4c and is vertically movable and rotatable relative to the second arm 4c. At a tip, that is, a lower end side of the shaft 4d, a hand 11 shown in FIG. 2 is attached. The hand 11 can also be attached to the shaft 4d via a flange or the like. Further, as the robot 4, a so-called 6-axis robot or 7-axis robot of a vertical articulated type can also be adopted.

The hand 11 includes an attached portion 11a and two gripping portions 11b. The attached portion 11a is attached to the shaft 4d. The gripping portions 11b are movable in a horizontal direction shown in FIG. 2 and grip the workpiece 6 in a predetermined direction. In the present embodiment, the gripping portions 11b grip the workpiece 6 from a thickness direction of the workpiece 6. Then, as will be described later, the robot 4 assembles the workpiece 6 picked up from the tray 9 as it is, that is, by inserting it into, for example, a slit 8a of the object 8 without re-gripping the workpiece 6.

At this time, since the hand 11 grips the workpiece 6 from a side opposite to a side inserted into the slit 8a, the hand 11 can assemble the workpiece 6 to the slit 8a without interfering with the object 8. Further, since the hand 11 is generally attached to the shaft 4d so as to be coaxially rotatable, the workpiece 6 can be rotated horizontally. If the robot 4 is a vertical articulated robot, the workpiece 6 can be oriented in any direction.

Figure 3:
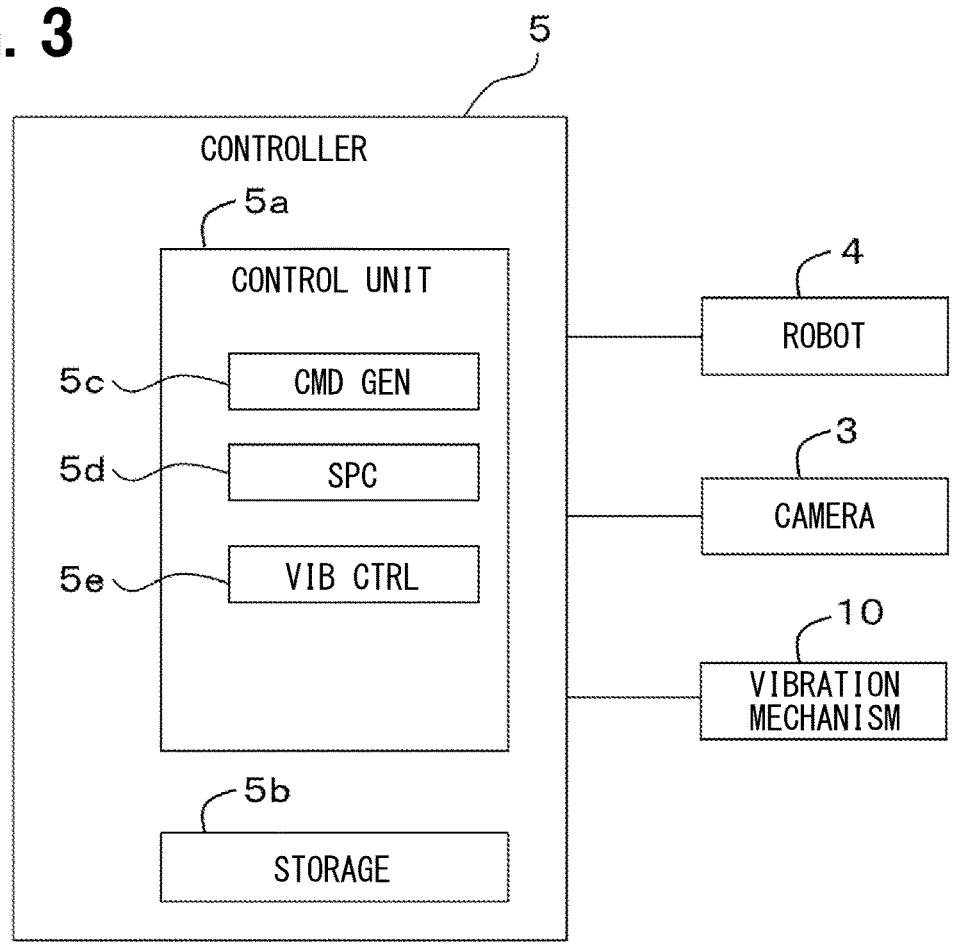
FIG. 3 is a diagram schematically showing an electrical configuration of a controller.

The operation of the robot 4 provided with the hand 11 is controlled by the controller 5. As shown in FIG. 3, the controller 5 includes a control unit 5a composed of a microcomputer having a CPU, a ROM, a RAM, and the like (not shown), a storage 5b composed of a semiconductor memory, and the like. Although not shown, the controller 5 also includes an input-output circuit for transmitting and receiving data to or from an external device.

The controller 5 controls the robot 4 and, in the present embodiment, the camera 3 and the vibration mechanism 10 by executing a computer program stored in the storage 5b. Specifically, the control unit 5a is provided with a command value generation unit (CMD GEN) 5c, a specifying unit (SPC) 5d, a vibration control unit (VIB CTRL) 5e, and the like. In the present embodiment, each of these units is realized by software by executing a computer program by the control unit 5a.

The command value generation unit 5c generates and outputs a drive command to a motor provided in the robot 4. As a result, the motor (not shown) provided at a joint portion of the robot 4 is driven, and the robot 4 is controlled to arbitrary posture.

The specifying unit 5d performs an image processing to the image obtained by capturing the workpiece 6 placed on the tray 9. Accordingly, the specifying unit 5d specifies the workpiece 6 that is in a state capable of being gripped by the hand 11, more specifically, the workpiece 6 that is in the state capable of being gripped by the hand 11 and in the correct direction for being assembled to the object 8.

The vibration control unit 5e generates and outputs a command value for the vibration mechanism 10, which will be described in detail later. Then, the vibration mechanism 10 vibrates the tray 9 in two or three dimensions based on the output command value.

Figure 4A:
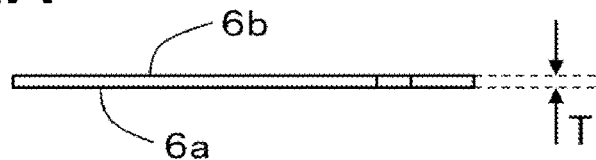
FIG. 4A is a diagram schematically showing a plan view of an example of a workpiece.
Figure 4B:
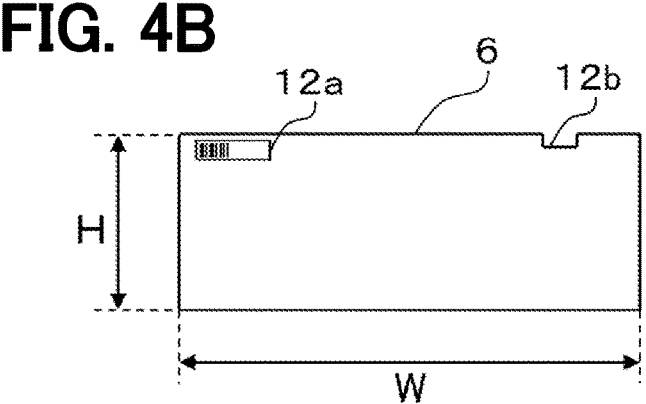
FIG. 4B is a diagram schematically showing a front view of the example of the workpiece.
Figure 4C:
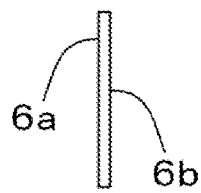
FIG. 4C is a diagram schematically showing a side view of the example of the workpiece.

The workpiece 6 to be worked by the gripping apparatus 1 may have a plate shape, and may be relatively small. As shown in FIG. 4A to FIG. 4C, the workpiece 6 has a rectangular plate shape, for example. In the front view shown in FIG. 4B, the workpiece 6 has a length W in the left-right direction in which an outer dimension is maximum, and a length H in the up-down direction. Further, in the plan view shown in FIG. 4A, the workpiece 6 has a length T. Hereinafter, W is also referred to as a width of the workpiece 6, H is also referred to as a height of the workpiece 6, and T is also referred to as a thickness of the workpiece 6.

In the present embodiment, the term "plate shape" means that the thickness the workpiece 6 is smaller than the width and height of the workpiece 6. To put it simply, it is assumed that the workpiece 6 is placed flat with its front surface 6a or rear surface 6b facing in the vertical direction when the workpiece 6 is supplied to the tray 9 in a batch manner or when a slight vibration is applied to the workpiece 6.

Further, the term "small" means that, for example, the maximum outer dimension, in the present embodiment, the width (W) is about several centimeters, or the height (H) shorter than the width is about several centimeters. However, the workpiece 6 is not limited to a rectangular plate shape, and may be a plate shape including a curved line, a triangular plate shape, or a polygonal plate shape of 5 or more sides. Workpieces having such shapes are collectively referred to workpieces of plate shape in the present embodiment.

Further, in the present embodiment, it is assumed that the direction of the workpiece 6 when assembled to the object 8 is predetermined, and the direction of the workpiece 6 is determined by an identifier 12 provided in the workpiece 6 as described later. For example, in the case of the workpiece 6 shown in FIG. 4A to FIG. 4C, a label 12a attached to the workpiece 6 and a notch 12b provided on the upper side of the workpiece 6 are assumed as the identifier 12. Then, it is assumed that the direction in which the label 12a and the notch 12b are upward is the correct direction when the workpiece 6 is gripped or assembled to the object 8.

However, in addition to these examples, the identifier 12 can also be any identifier such as characters, symbols, or wiring patterns printed on the workpiece 6 from which the correct direction when assembling the workpiece 6 can be visually determined. In that case, one or more identifiers 12 can be provided on the workpiece 6. Further, when multiple identifiers 12 are provided, the correct direction can be determined based on the identification result of one identifier 12, and can also be determined based on the identification result of two or more identifiers 12 such as the physical shape of the workpiece 6 and printing.

Hereinafter, in the present embodiment, the correct direction when gripping the workpiece 6 or assembling the workpiece 6 to the object 8, that is, a state where the workpiece 6 stands up with respect to a placement surface 9a of the tray 9 and the label 12a is positioned on the upper side is also referred to as a standing state.

Figure 5A:
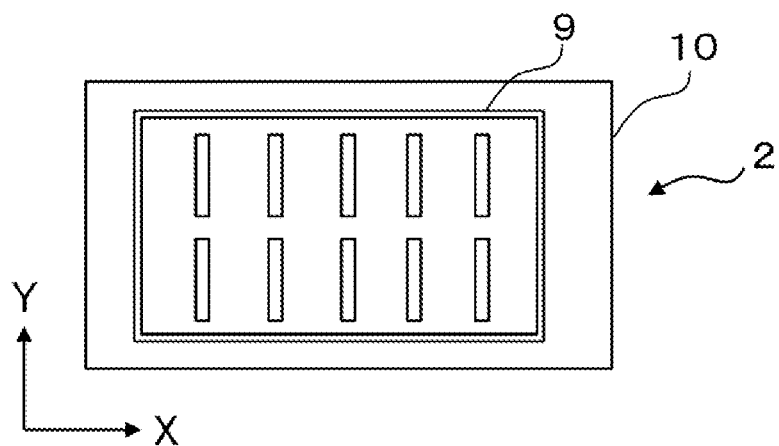
FIG. 5A is a diagram schematically showing a plan view of a feeder.
Figure 5B:
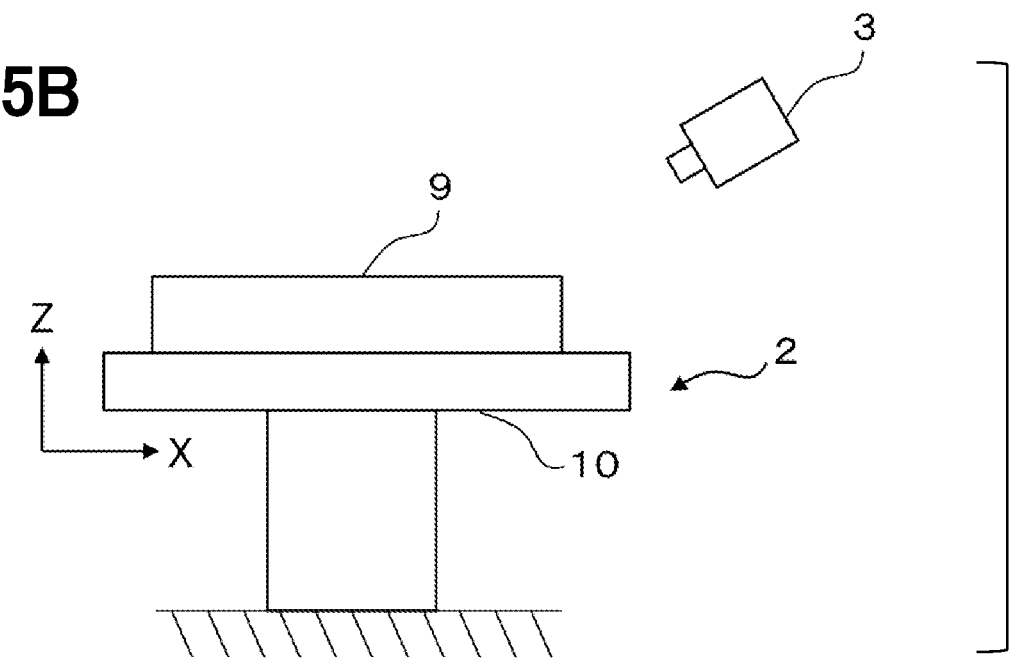
FIG. 5B is a diagram schematically showing a front view of the feeder.

As shown in FIG. 1 and FIG. 4A to FIG. 4C, the workpiece 6 is supplied to the gripping apparatus 1 in a state of being placed on the tray 9 mounted on the vibration mechanism 10. As shown in FIG. 5A and FIG. 5B, the tray 9 is mounted on the vibration mechanism 10 and is capable of being vibrated as a whole. When the left-right direction shown in the plan view of FIG. 5A is the X direction, the up-down direction shown in the plan view of FIG. 5A is the Y direction, and the up-down direction shown in the front view of FIG. 5B is the Z direction, the tray 9 can vibrate in any one direction, any two directions, or all three directions of the X direction, the Y direction, and the Z direction. Hereinafter, the vibration in the X direction and the Y direction is also referred to as a vibration in the horizontal direction.

When the tray 9 is vibrated in, for example, the X direction or the Y direction while the workpieces 6 are placed on the tray 9, the workpieces 6 placed on the placement surface 9a move in the tray 9 accompanied with the vibration. Further, when the tray 9 is vibrated in the Z direction, the workpieces 6 are momentarily lifted from the placement surface 9a. Therefore, even when multiple workpieces 6 are collectively supplied to the tray 9, the position of each workpiece 6 can be changed by vibrating the tray 9.

Figure 6:
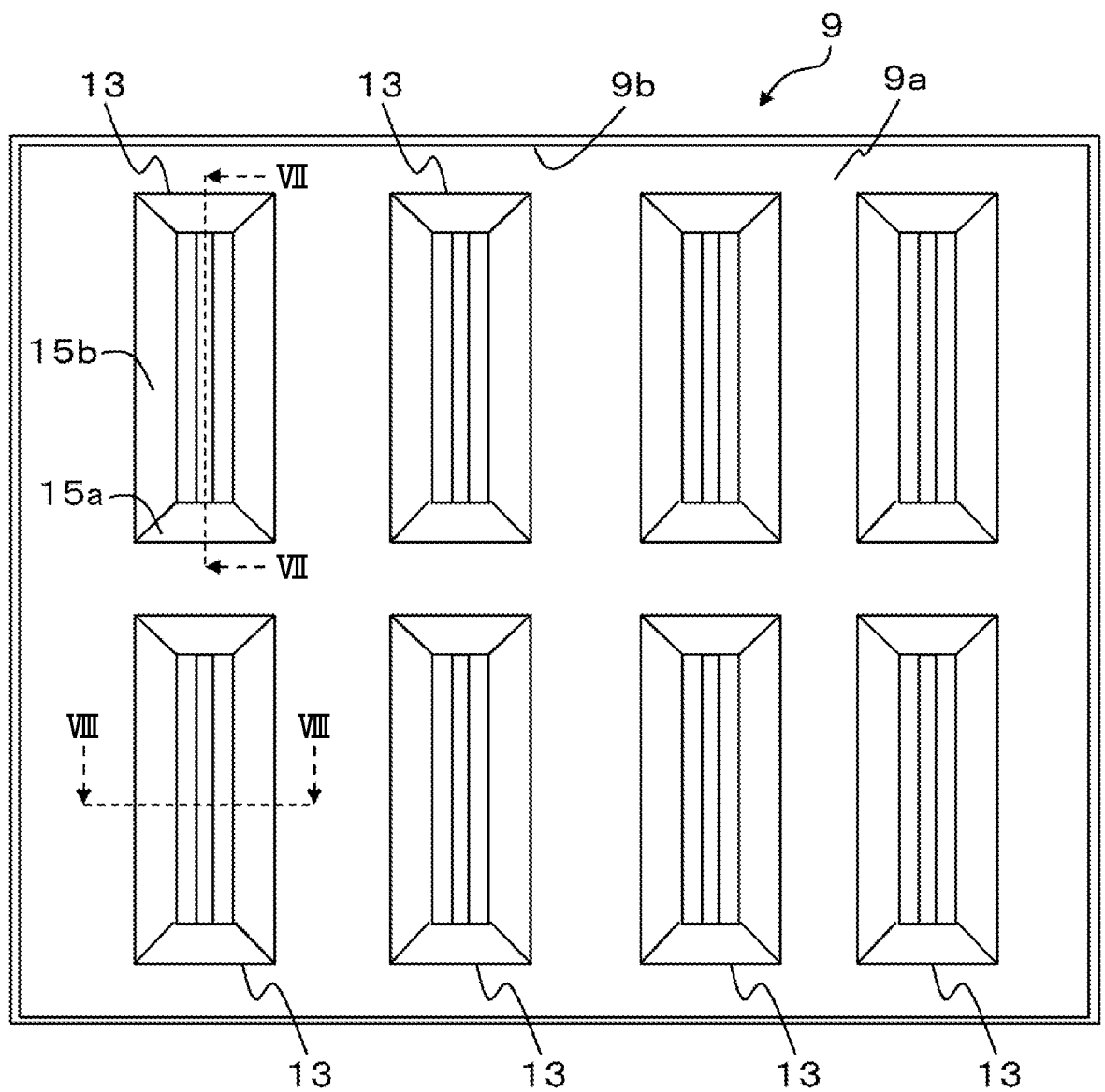
FIG. 6 is a diagram schematically showing a structure of a tray.

As shown in FIG. 6, the tray 9 has the placement surface 9a on which the workpieces 6 are to be placed and a wall portion 9b provided around the placement surface 9a, and is formed in a shape of a container with an open upper part when the tray 9 is mounted on the vibration mechanism 10. The placement surface 9a is provided with multiple recesses 13 for aligning the workpieces 6 in the standing state. In other words, the recesses 13 are provided to align the workpieces 6 in the standing state in which the workpieces 6 can be gripped by the hand 11. However, the shape of the tray 9 and the number of recesses 13 or the arrangement of the recesses 13 shown in FIG. 6 are examples, and are not limited thereto.

Specifically, as shown in FIG. 7A, FIG. 7B, FIG. 8A and FIG. 8B, each recess 13 includes a groove 14 formed by being recessed from the placement surface 9a and an inclined surface 15 inclined toward the groove 14 from the placement surface 9a. In the plan view, the groove 14 is formed into a rectangular shape having a lateral side corresponding to the thickness direction of the workpiece 6 and a longitudinal side corresponding to the width direction of the workpiece 6, and has such a size that one workpiece 6 in the standing state can be inserted.

On the other hand, in the case of the present embodiment, the inclined surface 15 includes a lateral inclined surface 15a formed along the lateral side of the groove 14 and a longitudinal inclined surface 15b formed along the longitudinal side of the groove 14. However, the inclined surface 15 may also have a configuration in which either the lateral inclined surface 15a or the longitudinal inclined surface 15b is provided.

Figure 7A:
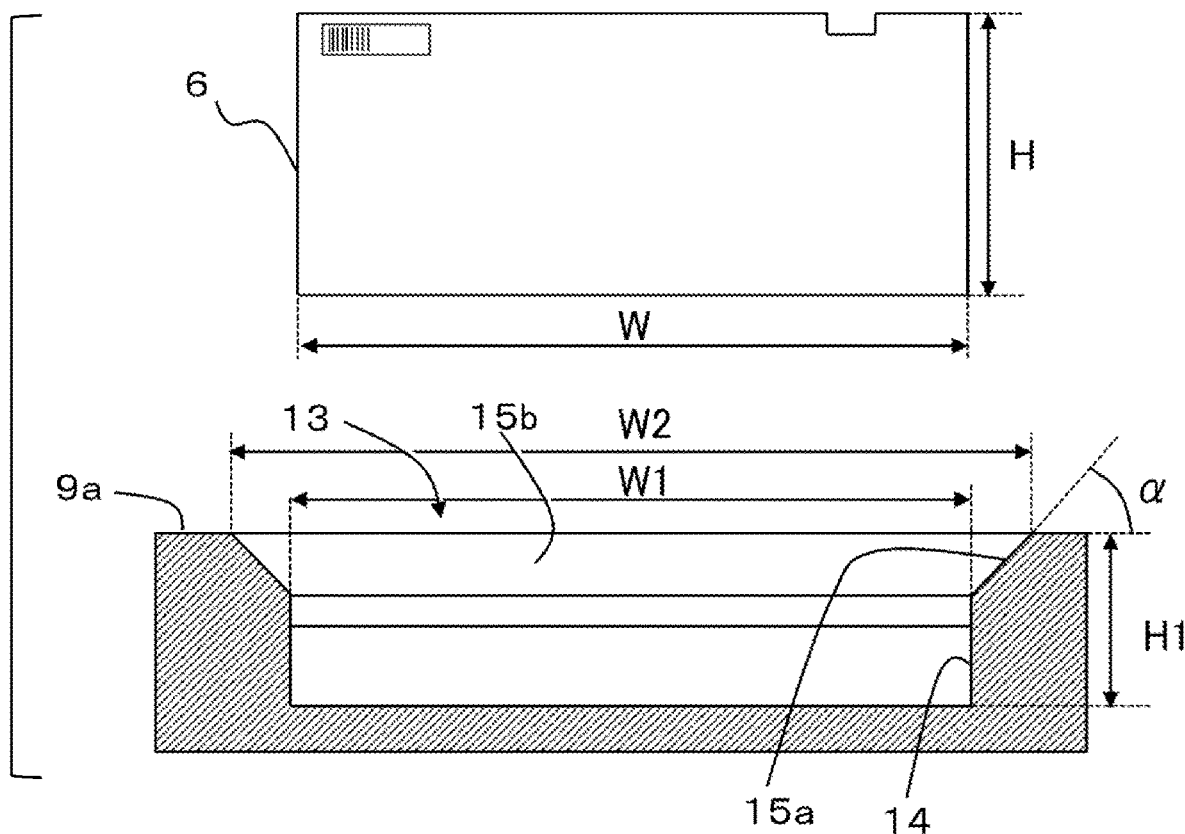
FIG. 7A is a diagram schematically showing the workpiece and a cross section of a recess taken along line VII-VII in FIG. 6.
Figure 7B:
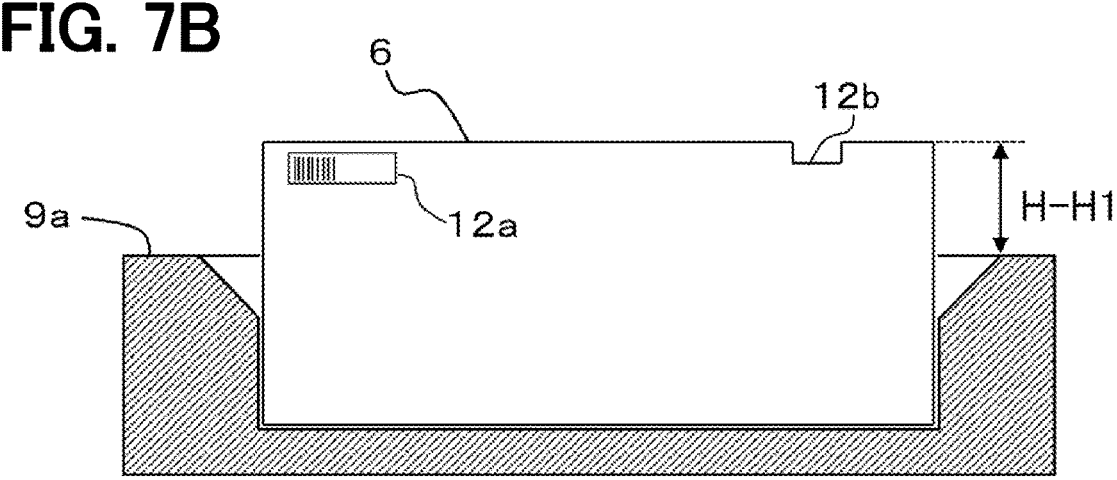
FIG. 7B is a diagram schematically showing a state where the workpiece is fitted in the recess.

More specifically, as shown in FIG. 7A and FIG. 7B, the groove 14 has a width (W1) slightly larger than the width (W) of the workpiece 6, a thickness (T1) slightly larger than the thickness (T) of the workpiece 6 and smaller than 2×T, and a height (H1) from the placement surface 9a to the lower end, which is shorter than the height (H) of the workpiece 6. Therefore, as shown in the inserted state in FIG. 7B, when the lower end side of the workpiece 6 is inserted into the groove 14, the upper end side of the workpiece 6 protrudes upward from the placement surface 9a by H–H1. The portion protruding upward from the placement surface 9a becomes a portion gripped by the hand 11.

As shown in FIG. 7A, the lateral inclined surface 15a is inclined at an inclination angle ($\alpha$) of approximately 45 degrees with respect to the placement surface 9a and is connected to the groove 14. Therefore, the entire width (W2) of the recess 13 including the lateral inclined surface 15a is larger than the width (W) of the workpiece 6. Therefore, when the workpiece 6 moves in the left-right direction shown in FIG. 7A and FIG. 7B, the entire workpiece 6 is put into the recess 13. However, the inclination angle ($\alpha$) is an example, and an angle other than 45 degrees can be set.

Figure 8A:
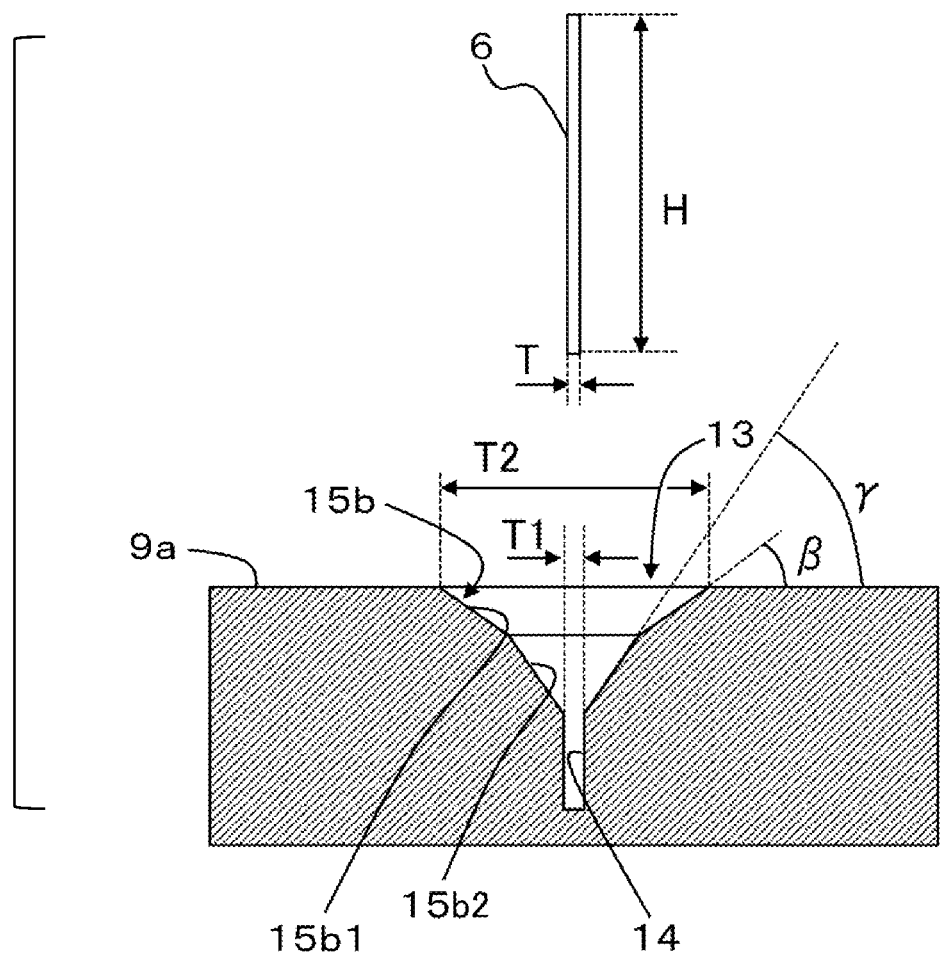
FIG. 8A is a diagram schematically showing the workpiece and a cross section of the recess taken along line VIII-VIII in FIG. 6.
Figure 8B:
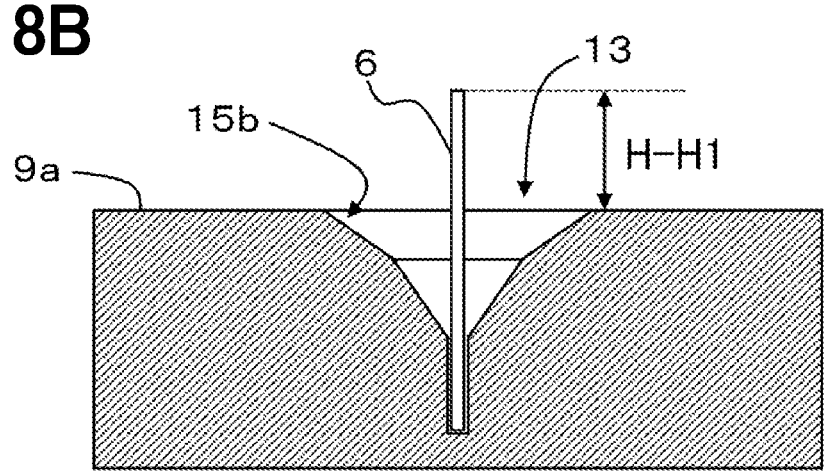
FIG. 8B is a diagram schematically showing the state where the workpiece is fitted in the recess.

As shown in FIG. 8A, the longitudinal inclined surface 15b has a first inclined surface 15b1 and a second inclined surface 15b1. The first inclined surface 15b1 is inclined at an inclination angle ($\beta$) of about 45 degrees with respect to the placement surface 9a. The second inclined surface 15b1 connects a lower end side of the first inclined surface 15b1 and the groove 14. The second inclined surface 15b1 is inclined at an inclination angle ($\gamma$) of about 60 degrees with respect to the placement surface 9a. However, the inclination angle ($\beta$) and the inclination angle ($\gamma$) are examples, and other angles can be set. Further, the longitudinal inclined surface 15b can be formed in a shape such that $\beta>\gamma$, or the second inclined surface 15b2 may be omitted.

Next, the effects of the configuration described above will be explained. As described above, when multiple workpieces 6 of plate shape are supplied to the tray 9 in a batch manner, it is considered that the workpieces 6 are basically placed flat because the thickness of the workpieces 6 is thin. In this case, when assembling the workpiece 6 to the object 8, it is conceivable to suction and pick up the workpiece 6 in the flat state, for example. However, depending on a size of a suction pad and a magnitude of a suction force, it may be difficult to assemble the suctioned workpiece 6 to the object 8 as it is.

Further, when the direction when assembling the workpiece 6 to the object 8 is predetermined as in the present embodiment, there may be a case where the workpiece 6 in the flat state is once picked up from the tray 9, temporarily placed in the predetermined direction, and re-gripped in a correct direction. In that case, it is necessary to take a long time to work, provide multiple hands 11, and provide a temporary storage place.

Figure 9:
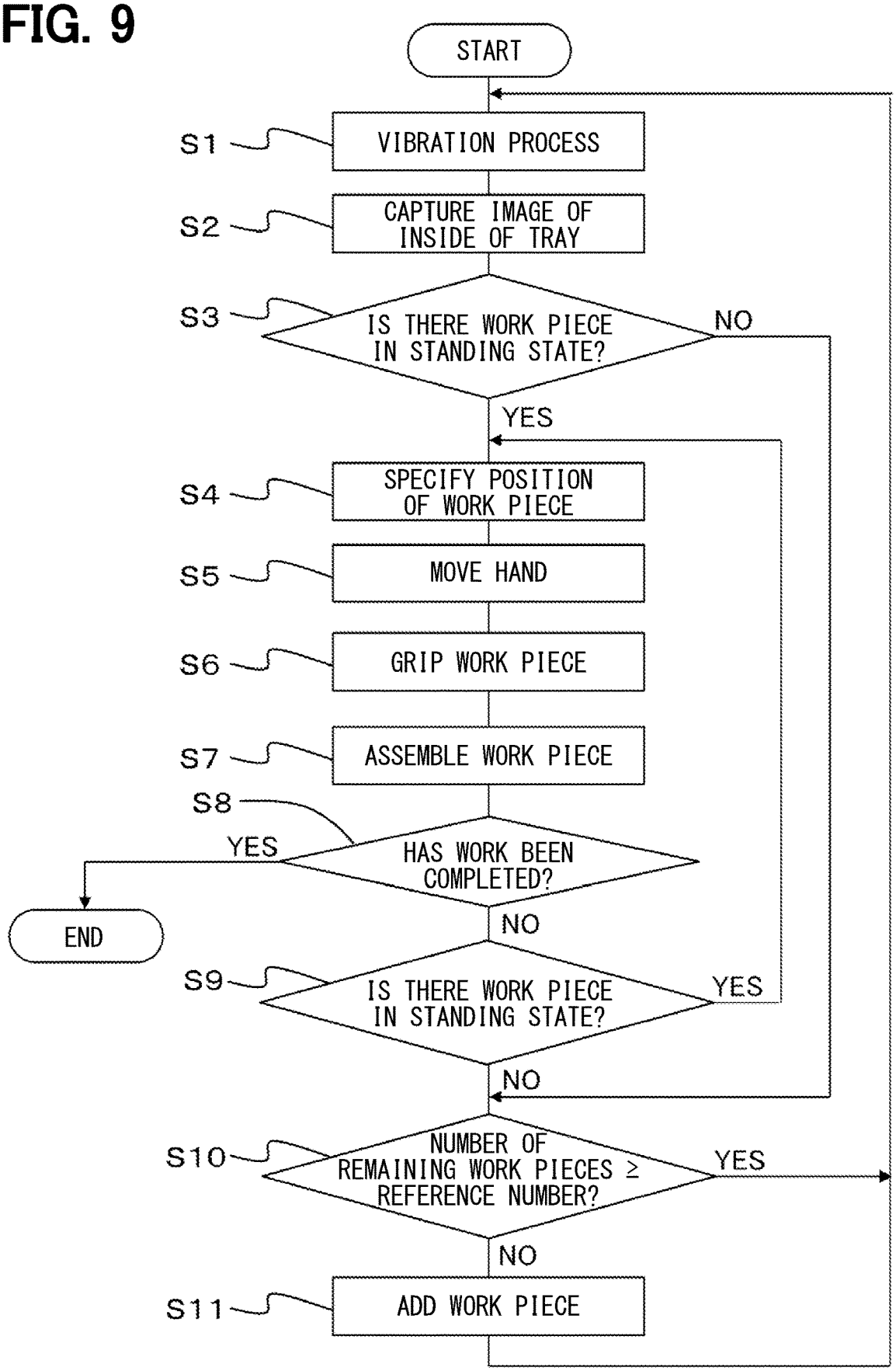
FIG. 9 is a diagram showing a flow of a gripping process.

Therefore, the gripping apparatus 1 is configured to grip the workpiece 6 of plate shape with one hand 11 in the predetermined direction. Specifically, the gripping apparatus 1 executes a gripping process shown in FIG. 9. This process is executed by the controller 5, but for the sake of simplification of the description, the gripping apparatus 1 will be mainly described below. Further, it is assumed that multiple workpieces 6 are supplied to the tray 9 in the batch manner and each workpiece 6 is placed in a substantially flat state before the gripping process is executed.

First, in S1, the gripping apparatus 1 executes a vibration process for vibrating the tray 9 to which the workpieces 6 are supplied. At this time, the gripping apparatus 1 vibrates the tray 9 by outputting a vibration direction and a vibration time for vibrating the tray 9 to the vibration mechanism 10 as command values. The following describes a moving mode of the workpiece 6 while the vibration process is being executed, that is, a mode in which the workpiece 6 in the flat state is aligned in the standing state with reference to FIG. 10A to FIG. 10E showing a cross section in the longitudinal direction of the recess 13 and FIG. 11A to FIG. 11E showing a cross section in the lateral direction of the recess 13.

In reality, changes in the movement mode shown in FIG. 10A to FIG. 10E and FIG. 11A to FIG. 11E may occur concurrently, but here, for the sake of simplification of the description, the movement mode in the longitudinal direction shown in FIG. 10A to FIG. 10E and the movement mode in lateral direction shown in FIG. 11A to FIG. 11E are described individually. Further, this step corresponds to a step of causing the workpiece 6 to be in the standing state.

Figure 10A:
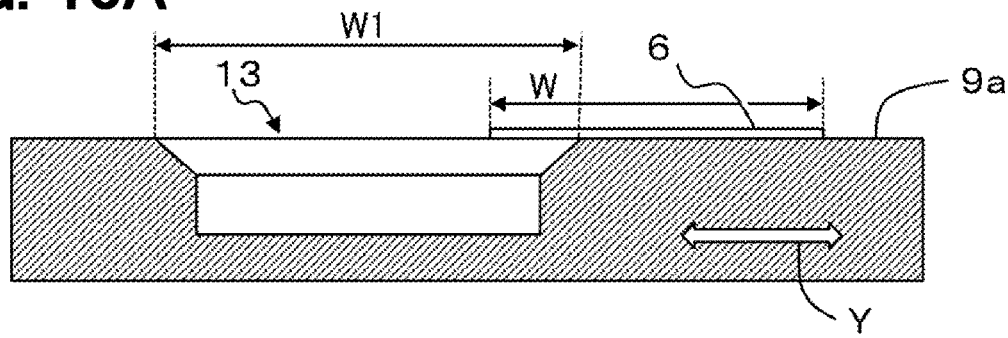
FIG. 10A to FIG. 10E are diagrams schematically showing a movement mode of the workpiece in a front view.
Figure 10B:
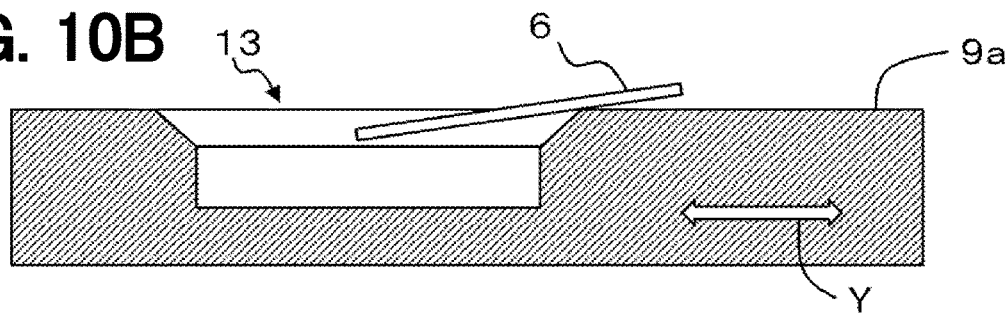

In the longitudinal direction, as shown in FIG. 10A, the vibration process is executed, for example, in a state where the workpiece 6 is placed horizontally on the placement surface 9a on the right side of the recess 13, and the tray 9 is vibrated in the horizontal direction such as the Y direction shown by the arrow Y. At this time, the workpiece 6 moves toward the recess 13 accompanied with the vibration of the tray 9 as shown in FIG. 10B, and is guided toward the groove 14 by the inclined surface 15.

Figure 10C:
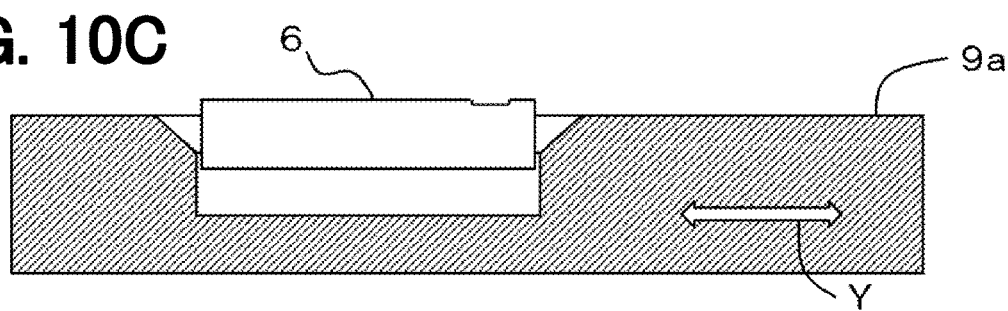
Figure 10D:
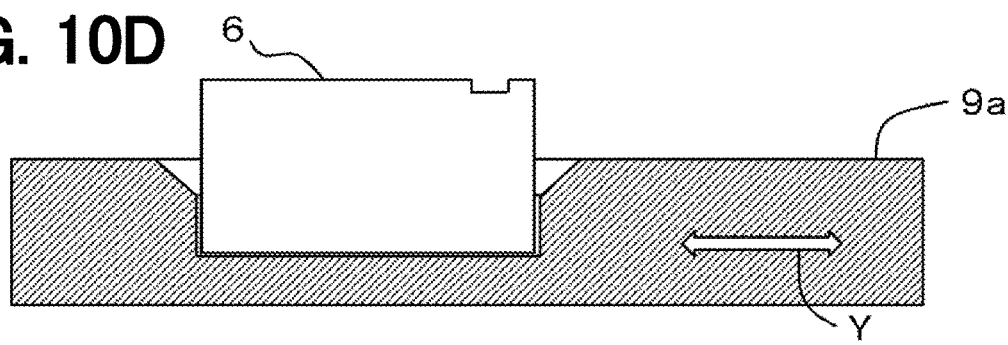

Since the width (W1) of the recess 13 is larger than the width (W) of the workpiece 6, the position of the workpiece 6 that has entered the range of the width of the recess 13 converges toward the groove 14 located at the lower end of the inclined surface 15 as shown in FIG. 10C. As a result, the lower end of the workpiece 6 is inserted into the groove 14, as shown in FIG. 10D.

Figure 11A:
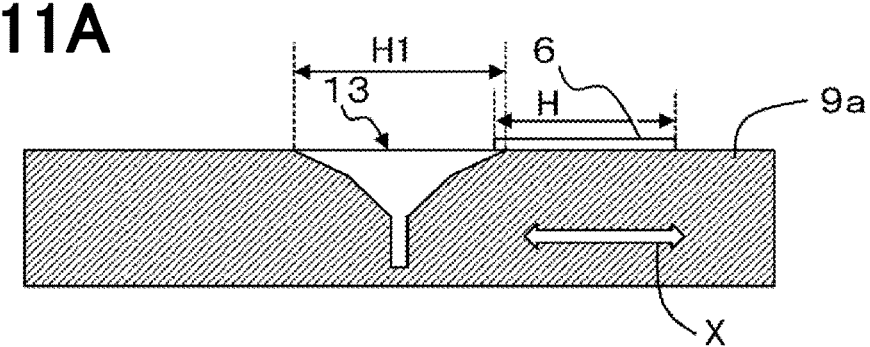
FIG. 11A to FIG. 11E are diagrams schematically showing a movement mode of the workpiece in a side view.
Figure 11B:
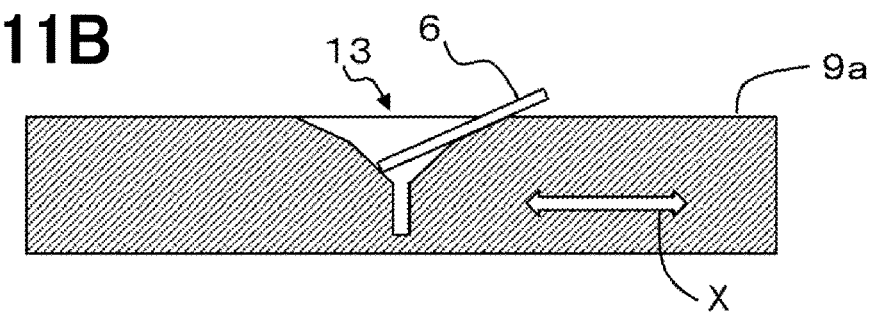

In the lateral direction, as shown in FIG. 11A, the vibration process is executed, for example, in a state where the workpiece 6 is placed horizontally on the placement surface 9a on the right side of the recess 13, and the tray 9 is vibrated in the horizontal direction such as the X direction shown by the arrow X. At this time, the workpiece 6 moves toward the recess 13 accompanied with the vibration of the tray 9 as shown in FIG. 11B, and is guided toward the groove 14 by the inclined surface 15.

Figure 11C:
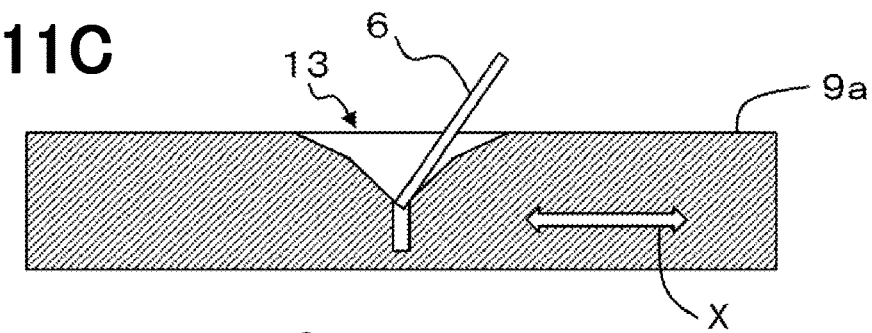
Figure 11D:
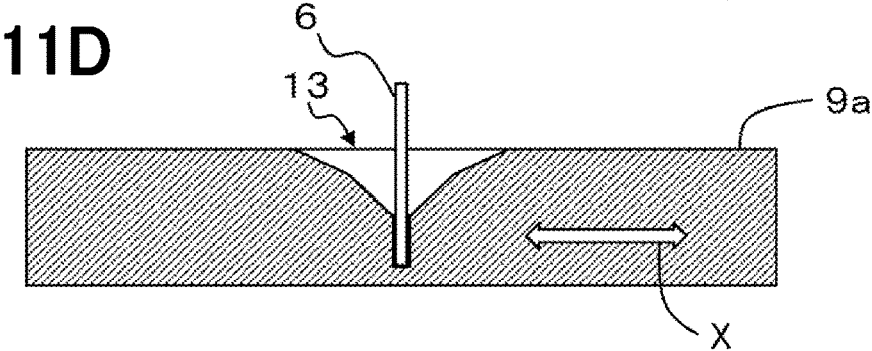

Since the thickness (T1) of the recess 13 is larger than the thickness (T) of the workpiece 6, the position of the workpiece 6 that has entered the range of the thickness of the recess 13 converges toward the groove 14 located at the lower end of the inclined surface 15 as shown in FIG. 11C. As a result, the lower end of the workpiece 6 is inserted into the groove 14, as shown in FIG. 11D.

By executing the vibration process of vibrating the tray 9 in this way, the lower end of the workpiece 6 is inserted into the groove 14, and the workpiece 6 is in the standing state with its thickness direction along the placement surface 9a. It is assumed that multiple workpieces 6 are guided toward the same recess 13, but since the groove 14 is formed to be as large as the thickness of one workpiece 6, one workpiece 6 is arranged in one recess 13.

However, the vibration process does not necessarily guarantee that all the workpieces 6 will be in the standing state, and is performed with the expectation that a certain number of workpieces 6 will be in the standing state. In addition, performing some process with expectation of a certain result in this way can also be expected to shorten the cycle time as a result, so it is a general idea in the technical field of aligning the direction of parts by vibration.

Therefore, in the present embodiment, by conducting a preliminary experiment, the vibration process is executed by setting the vibration direction and the vibration time in which a certain number of workpieces 6 are expected to be in the standing state. Therefore, when the vibration process is completed, it can be expected that the certain number of workpieces 6 are in the standing state.

However, it is also possible to dynamically change the vibration time and the vibration time. For example, the vibration process may be executed while capturing an image of the inside of the tray 9 with the camera 3, and the vibration process may be completed when the number of the workpieces 6 in the standing state reaches a certain number, or the vibration direction may be determined according to the direction of the workpiece 6.

When the vibration process is completed, the gripping apparatus 1 captures an image of the inside of the tray 9 with the camera 3 in S2. Subsequently, in S3, the gripping apparatus 1 determines whether there is a workpiece 6 in the standing state by performing image processing on the captured image.

At this time, the gripping apparatus 1 determines whether there is a workpiece 6 in the standing state by recognizing the workpieces 6 present in the image and determining the directions of the workpieces 6 by using the identifier 12 provided on each of the workpiece 6. Further, in the case of the present embodiment, using the image captured in S2, it is determined in S3 whether multiple workpieces 6 present in the image are in the standing state.

Figure 10E:
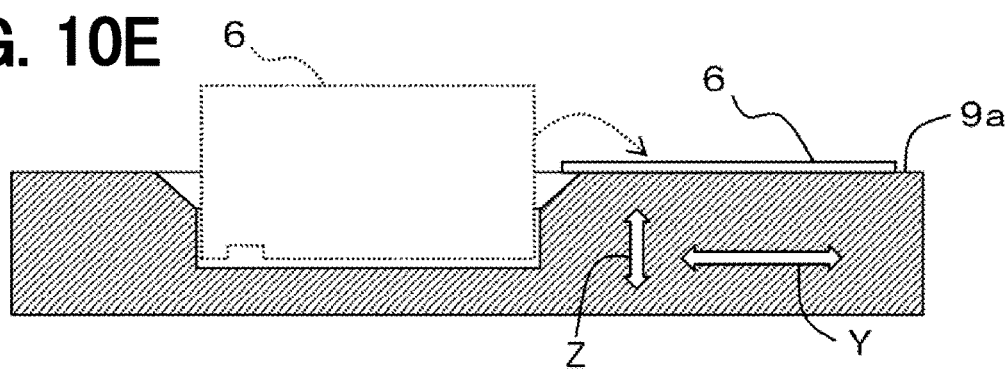
Figure 11E:
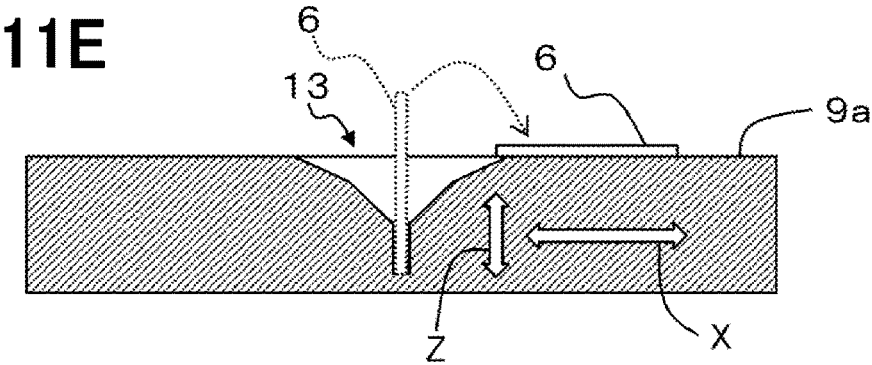

In a case where the workpiece 6 has a plate shape, there is a possibility that workpiece 6 is inserted in a state where the notch 12b is located at the lower end side of the groove 14, that is, the direction is upside down from the predetermined direction, for example, as shown in FIG. 10E and FIG. 11E. Therefore, in S3, the gripping apparatus 1 visually determines whether there is a workpiece 6 in the standing state by capturing the image of the inside of the tray 9 with the camera 3. This step corresponds to a step of determining whether the workpiece 6 is in the standing state.

As a result, the accuracy when determining the direction of the workpiece 6 can be improved, and the image of the entire inside of the tray 9 can be captured, so that the number of the workpieces 6 in the standing state and the number of workpieces 6 remaining in the tray 9 can be easily grasped.

Then, when there is a workpiece 6 in the standing state (YES in S3), the gripping apparatus 1 identifies the position of the workpiece 6 in the standing state in S4, and the hand 11 is moved and the workpiece 6 is gripped in S6. These steps correspond to steps of gripping the workpiece 6.

After that, the gripping apparatus 1 assembles the workpiece 6 to the object 8 in S7. That is, after the workpiece 6 is picked up from the tray 9, the gripping apparatus 1 assembles the workpiece 6 to the object 8 with one hand 11 without re-gripping the workpiece 6. This step corresponds to a step of assembling the workpiece 6 to the object 8.

When the assembly is completed, the gripping apparatus 1 determines in S8 whether the work has been completed. When the gripping apparatus 1 determines that the work has been completed (YES in S8), for example, when a required number of workpieces 6 are assembled, the process ends.

On the other hand, when the gripping apparatus 1 determines that the work has not been completed (NO in S8), determines in S9 whether there is another workpiece 6 in the standing state in the tray 9. Then, when there is another workpiece 6 in the standing state (YES in S9), the gripping apparatus 1 proceeds to S4 to repeat a process for specifying the position of the workpiece 6, moving the hand 11 in S5, gripping the workpiece 6 in S6, and assembling the workpiece 6 to the object 8 in S7.

In the present embodiment, since it is determined in S3 whether the workpiece 6 is in the standing state for multiple workpieces 6, it is determined in S9 whether there is another workpiece 6 without capturing another image. However, if the determination result in S8 is NO, the process proceeds to S2 to capture another image of the inside of the tray 9, and it may be determined whether there is another workpiece 6 in the standing state.

For example, when all the workpieces 6 in the standing state are assembled and the determination result in S9 becomes NO, or for example, when the workpieces 6 do not become the standing state even if the vibration process is executed and the determination result in S3 becomes NO, the gripping apparatus 1 determines in S10 whether the number of remaining workpieces 6 that remain in the tray 9 is equal to or greater than a predetermined reference number. That is, in S10, the gripping apparatus 1 determines the number of remaining workpieces 6 remaining in the tray 9 even though not in the standing state.

This is because, when the number of the remaining workpieces 6 is too small, it is considered that the workpieces 6 in the standing state can be more efficiently secured by adding the workpieces 6 and executing the vibration process, while when the number of the remaining workpieces 6 is large, it is considered the workpieces 6 in the standing state can be secured to some extent even if the vibration process is executed without adding the workpieces 6. Therefore, the reference number can be appropriately set based on, for example, a preliminary experiment or an empirical rule, or can be set by calculating the probability of being in standing state from the number of recesses 13 and the number of remaining workpieces 6.

In a case where the number of the workpieces 6 in the standing state is determined and a determination that a certain number or more of the workpieces 6 are in the standing state is a condition for ending the vibration, if the number is slightly less than the certain number, the workpieces 6 in the standing state may come off from the groove 14 by continuously applying the vibration strongly. Therefore, the workpieces 6 may be vibrated with a slightly weaker vibration than the initial strength. Further, if it is determined that the number of workpieces 6 in the standing state is overwhelmingly insufficient, although the workpieces 6 currently in the standing state will no longer be in the standing state, a vibration stronger than the initial strength may be applied. That is, the gripping apparatus 1 may have a configuration in which the vibration amount is adjustable.

Then, when the number of the remaining workpieces 6 is equal to or greater than the reference value (YES in S10), the process proceeds to S1 to execute the vibration process. On the other hand, when the number of the remaining workpieces 6 is less than the reference number (NO in S10), the process proceeds to S11 to add the workpieces 6 to the tray 9, and then the process proceeds to S1 to execute the vibration process.

At this time, it is assumed that the workpiece 6 not in the standing state is placed flat on the arranging plane 9a. However, for example, as shown in FIG. 10E, the workpiece 6 may be inserted in the groove 14 in the opposite direction. Therefore, when the process proceeds to S1, as shown in FIG. 10E and FIG. 11E, the gripping apparatus 1 vibrates the tray 9 in the Z direction, so that the workpiece 6 is discharged from the groove 14. That is, the inserted state of the workpiece 6 is reset once.

As a result, even if the workpiece 6 is inserted into the groove 14 in the opposite direction, the workpiece 6 can be discharged from the groove 14, and then vibrated in the X direction or the Y direction so that the workpiece 6 is guided to the recess 13 and is inserted into the groove 14. Even when the workpiece 6 is supplied or added to the tray 9, the workpiece 6 may be accidentally inserted into the groove 14 in the opposite direction. Therefore, in S1, the gripping apparatus 1 may first vibrate the tray 9 in the Z direction so that the inserted state is reset, and then vibrate the tray 9 in the X direction or the Y direction.

As described above, when the gripping apparatus 1 grips the workpiece 6 of plate shape, the workpiece 6 is once aligned in the standing state and then gripped from the thickness direction, so that the workpiece 6 can be gripped in the predetermined direction suitable for assembly, and the workpiece 6 can be assembled to the object 8 without being re-gripped.

According to the embodiment described above, the following effects can be achieved. The gripping apparatus 1 includes the tray 9, the feeder 2, the camera 3, the robot 4, and the controller 5. The tray 9 has the recesses 13 provided on the placement surface 9a on which the multiple workpieces 6 are to be placed, and the recesses 13 cause the workpieces 6 to be in the stating state in which the workpieces 6 stand with respect to the placement surface 9a. The feeder 2 includes the vibration mechanism 10 for vibrating the tray 9. The camera 3 captures an image of the workpieces 6 placed on the tray 9. The robot 4 is attached with the hand 11 for gripping the workpiece 6. The controller 5 controls the robot 4 and the vibration mechanism 10.

Then, the controller 5 executes a process of vibrating the tray 6 with the vibration mechanism 10 to move and insert the workpiece 6 into the recess 13, a process of specifying the workpiece 6 in the standing state by capturing an image of the tray 9 with the camera 3, and a process of controlling the robot 4 to grip the specified workpiece 6 from the thickness direction with the hand 11.

According to such a configuration, the gripping apparatus 1 can vibrate the tray 9 to align the workpiece 6 of plate shape, which is considered to be basically placed flat because of its thin thickness, in the standing state on the placement surface 9a, and can grip the workpiece 6 in the standing state from the thickness direction.

Therefore, the workpiece 6 of plate shape can be gripped with one hand 11 in the predetermined direction. Further, since the multiple recesses 13 are provided, the work efficiency can be improved.

Further, the controller 5 executes a process of assembling the gripped workpiece 6 to the object 8 without re-gripping the workpiece 6. As a result, the gripping apparatus can assemble the workpiece 6 to the object 8 without re-gripping the workpiece 6, and unlike the configuration in which the workpiece 6 is temporarily placed in the predetermined direction, the number of steps required for the work can be reduced, it is possible to suppress an increase in cycle time, it is not necessary to provide multiple hands 11, and it is not necessary to provide a temporary storage place. Therefore, the work efficiency can be improved, and the required equipment and installation space can be reduced.

The recess 13 provided in the tray 9 includes the groove 14 formed in such a size that the workpiece 6 can be inserted in the standing state, and the inclined surface 15 inclined toward the groove 14. Accordingly, when the tray 9 is vibrated in the X direction or the Y direction, the workpiece 6 is guided to the groove 14 along the inclined surface 15, so that the workpiece 6 is inserted into the groove 14 and the workpiece 6 is efficiently brought into the standing state.

Further, the controller 5 changes the amount of vibration when vibrating the tray 9 based on the number of workpieces 6 in the standing state. Accordingly, for example, when the number of workpieces 6 is a little less than a predetermined number, that is, the above-described reference value, although the workpieces 6 in the standing state may come off from the recess 13 if the workpieces 6 are continuously vibrated strongly, it is possible to encourage the workpieces 6 that are not in the standing state to be in the standing state while the workpieces 6 that are in the standing state remain the standing state by slightly weakening the amount of vibration.

Alternatively, for example, when it is determined that the number of the workpieces 6 in the standing state is overwhelmingly insufficient for the reference value, although a small number of the workpieces 6 in the standing state may no longer be in the standing state, by strengthening the amount of vibration, it is possible to encourage more workpieces 6 to be in the standing state.

When the workpiece 6 is arranged in the recess 13 in the opposite direction, the controller 5 resets the arrangement of the workpiece 6 by vibrating the tray 9. Accordingly, the workpiece 6 arranged in a direction different from the predetermined direction can be re-arranged in a state capable of being gripped, that is, in the predetermined direction.

Further, in the present embodiment, the camera 3 is used as the detector. Accordingly, the accuracy when determining the direction of the workpieces 6 can be improved, and the image of the entire inside of the tray 9 can be captured, so that the number of the workpieces 6 in the standing state and the number of workpieces 6 remaining in the tray 9 can be easily grasped, and it becomes easy to control the above-described change in the amount of vibration and reset of arrangement.

Further, using such a gripping apparatus 1, effects similar to those of the gripping apparatus 1, such as capable of gripping the workpiece 6 of plate shape with one hand 11, can be obtained by a method including a step of moving and inserting the workpieces 6 into the recesses 13 by vibrating the tray 9, a step of specifying the workpieces 6 in the standing state by capturing an image of the tray 9 with the camera 3, a step of controlling the robot 4 to grip the specified workpiece 6 from the thickness direction with the hand 11.

Figure 12A:
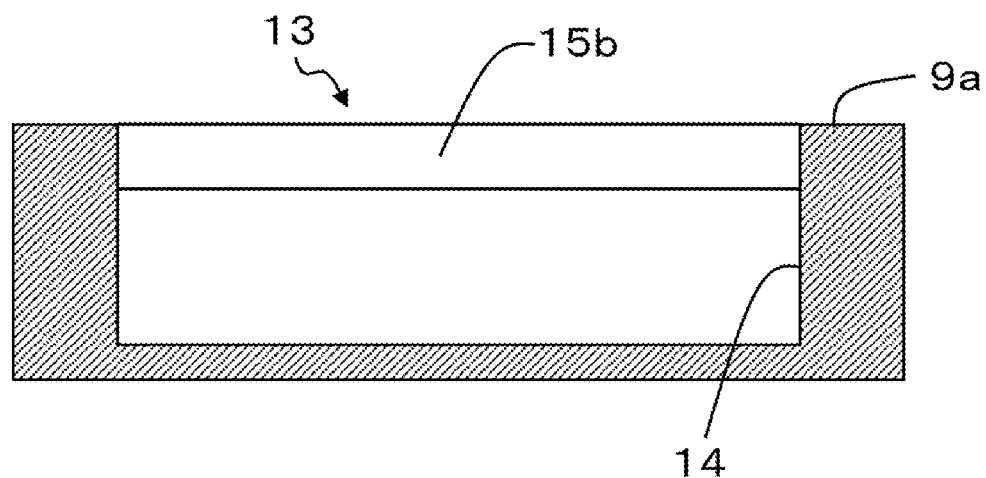
FIG. 12A is a diagram schematically showing another configuration example of the recess.

The above-described embodiment illustrates the configuration in which the longitudinal inclined surface 15b and the lateral inclined surface 15a are provided. In another configuration example, as shown in FIG. 12A, only the longitudinal inclined surface 15b may be provided while the lateral inclined surface 15a is not provided. Even with such a configuration, since the workpiece 6 can be guided to the groove 14, it is possible to obtain the effects, such as capable of gripping the workpiece 6 of plate shape with one hand 11 in the predetermined direction.

Figure 12B:
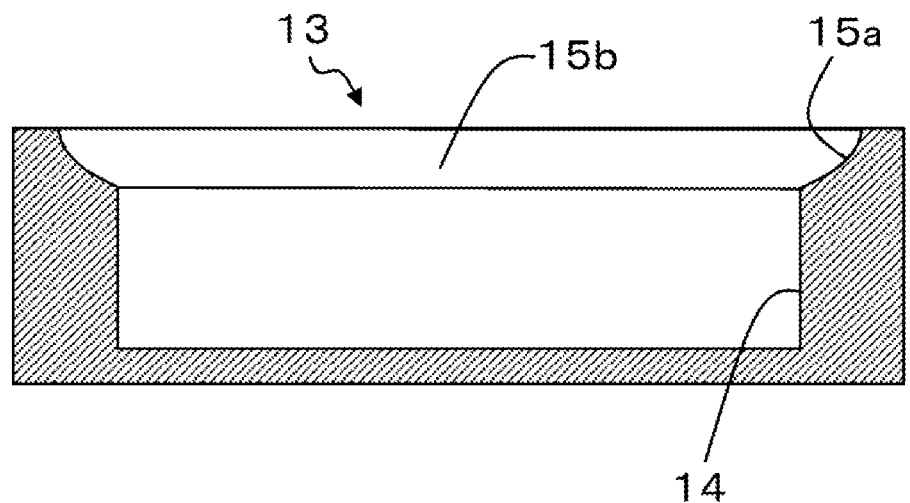
FIG. 12B is a diagram schematically showing another configuration example of the recess.

In another configuration example, as shown in FIG. 12B, the lateral inclined surface 15a may be formed into a curved surface. Further, the longitudinal inclined surface 15b may also be formed into a curved surface. Even with such a configuration, since the workpiece 6 can be guided to the groove 14, it is possible to obtain the effects, such as capable of gripping the workpiece 6 of plate shape with one hand 11 in the predetermined direction.

Figure 13A:
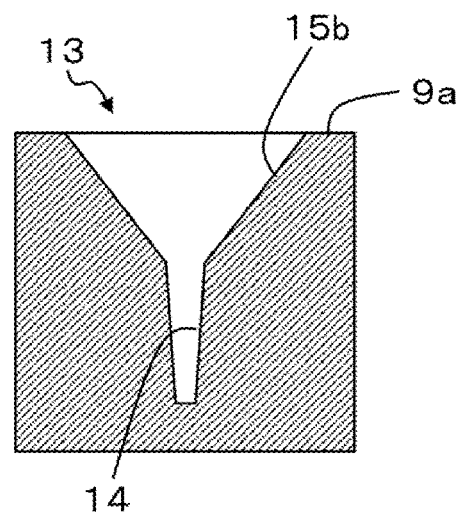
FIG. 13A is a diagram schematically showing another configuration example of the recess.

The above-described embodiment illustrates the configuration in which the first inclined surface 15b1 and the second inclined surface 15b2 are provided on the longitudinal inclined surface 15b. In another configuration example, as shown in FIG. 13A, the longitudinal inclined surface 15b may be provided with one inclined surface. The groove 14 may also be tapered toward the lower end. Even with such a configuration, since the workpiece 6 can be guided to the groove 14, it is possible to obtain the effects, such as capable of gripping the workpiece 6 of plate shape with one hand 11 in the predetermined direction.

Figure 13B:
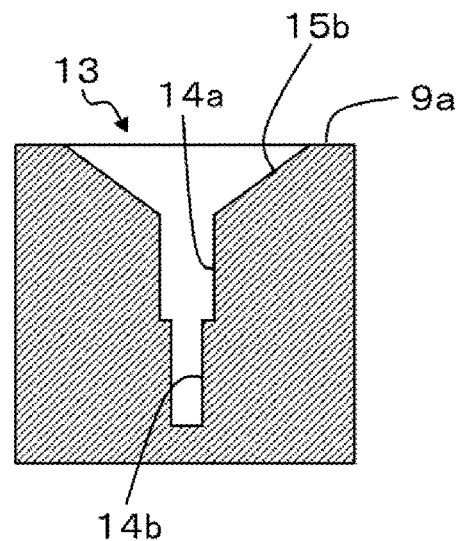
FIG. 13B is a diagram schematically showing another configuration example of the recess.

In another configuration example, as shown in FIG. 13B, the groove 14 may include a first portion 14a and a second portion 14b narrower than the first portion 14a. With such a configuration, when the workpiece 6 is guided to the groove 14, the insertion into the groove 14 can be promoted. Of course, it is possible to obtain the effects, such as capable of gripping the workpiece 6 of plate shape with one hand 11 in the predetermined direction.

Figure 13C:
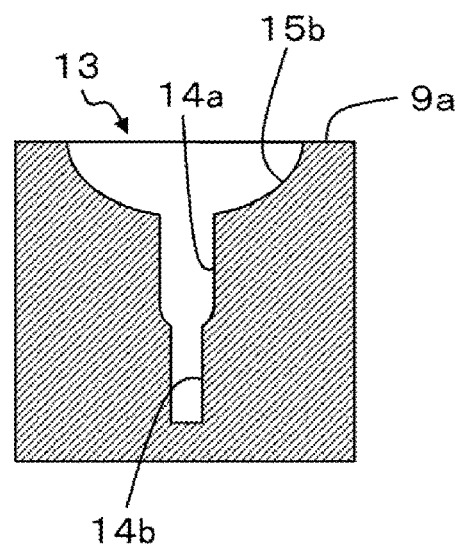
FIG. 13C is a diagram schematically showing another configuration example of the recess.

Further, these configuration examples can be combined with the configuration of the above-described embodiment or other configuration examples. For example, as shown in FIG. 13C, the longitudinal inclined surface 15b may be formed into a curved surface, the groove 14 may include the first portion 14a, the second portion 14b narrower than the first portion 14a, and a taper portion between the first portion 14a and the second portion 14b. Even with such a configuration, when guiding the workpiece 6 to the groove 14, insertion into the groove 14 can be promoted, and it is possible to obtain the effects, such as capable of gripping the workpiece 6 of plate shape with one hand in the predetermined direction.

The above description is merely examples and does not limit the technical scope of the present disclosure. The present disclosure can be modified and combined in various ways without departing from the gist thereof, and they are also included in the equivalent range.

What is claimed is:

1. A gripping apparatus comprising:
 a tray capable of being vibrated and having a placement surface on which a plurality of workpieces of plate shape is to be placed, the placement surface provided with a plurality of recesses configured to cause the workpieces placed on the tray to be in a standing state with respect to the placement surface;
a detector configured to detect arrangement of the workpieces placed on the tray;
a robot attached with a hand configured to grip one of the workpieces; and
a controller configured to control the detector, the robot, and vibration of the tray, wherein
each of the plurality of workpieces has an identifier, and the controller is further configured to:
  move and insert the workpieces into the recesses by vibrating the tray;
  specify the workpieces in the standing state with the detector; and
  instruct the robot to grip one of the workpieces in the standing state with the hand in a predetermined direction; and
  when one of the workpieces is inserted into one of the recesses in a state of being upside down from the predetermined direction, vibrate the tray in a vertical direction so that the one of the workpieces is momentarily lifted from the placement surface and discharged from the one of the recesses, and arrangement of the one of the workpieces is reset,
  determine whether one of the plurality of workpieces inserted into one of the recesses is in the predetermined direction or in the state of being upside down from the predetermined direction based on a position of the identifier detected by the detector.

2. The gripping apparatus according to claim 1, wherein the controller is further configured to instruct the robot to assemble the one of the workpieces that is gripped to an object without re-gripping the one of the workpieces.

3. The gripping apparatus according to claim 1, wherein each of the recesses has a groove and an inclined surface, the groove has such a size that one of the workpieces is capable of being inserted in the groove in the standing state, and
the inclined surface is inclined toward the groove.

4. The gripping apparatus according to claim 1, wherein the controller is further configured to change the amount of vibration when vibrating the tray based on the number of workpieces in the standing state.

5. The gripping apparatus according to claim 1, wherein the detector includes a camera.

6. A gripping method comprising:
using a gripping apparatus including a tray, a detector, a robot, and a controller, the tray capable of being vibrated and having a placement surface on which a plurality of workpieces of plate shape is to be placed, the placement surface provided with a plurality of recesses configured to cause the workpieces placed on the tray to be in a standing state with respect to the placement surface, the detector configured to detect arrangement of the workpieces placed on the tray, the robot attached with a hand configured to grip one of the workpieces, the controller configured to control the detector, the robot and vibration of the tray;
moving and inserting the workpieces into the recesses by vibrating the tray;
specifying the workpieces in the standing state by detecting arrangement of the workpieces with the detector;
controlling the robot to grip one of the workpieces that are specified with the hand in a predetermined direction; and
when one of the workpieces is inserted into one of the recesses in a state of being upside down from the predetermined direction, vibrating the tray in a vertical direction so that the one of the workpieces is momentarily lifted from the placement surface and discharged from the one of the recesses, and arrangement of the one of the workpieces is reset, wherein:
each of the plurality of workpieces has an identifier, and
the gripping method further comprises determining whether one of the plurality of workpieces inserted into one of the recesses is in the predetermined direction or in the state of being upside down from the predetermined direction based on a position of the identifier detected by the detector.

7. A gripping apparatus comprising:
a tray having a placement surface on which a plurality of workpieces of plate shape is to be supplied, the placement surface provided with a plurality of recesses having such a size that one of the workpieces is capable of being inserted in one of the recesses in a standing state with respect to the placement surface each of the plurality of workpieces having an identifier;
a vibration mechanism configured to vibrate the tray mounted on the vibration mechanism;
a detector configured to detect arrangement of the workpieces placed on the tray;
a robot attached with a hand configured to grip one of the workpieces; and
a controller including a processor and a memory, the memory storing a computer program including instructions configured to, when executed by the processor, cause the processor to:
  move and insert the workpieces in the recesses by instructing the vibration mechanism to vibrate the tray;
  specify the workpieces in the standing state based on the arrangement of the workpieces detected by the detector;
  instruct the robot to grip one of the workpieces in the standing state with the hand in a predetermined direction; and
  when one of the workpieces is inserted into one of the recesses in a state of being upside down from the predetermined direction, vibrate the tray in a vertical direction so that the one of the workpieces is momentarily lifted from the placement surface and discharged from the one of the recesses, and arrangement of the one of the workpieces is reset; and
  determine whether one of the plurality of workpieces inserted into one of the recesses is in the predetermined direction or in the state of being upside down from the predetermined direction based on a position of the identifier detected by the detector.

8. The gripping apparatus according to claim 1, wherein the identifier is positioned at an upper portion of each of the plurality of workpieces when each of the plurality of workpieces is in the predetermined direction.

9. The gripping method according to claim 6, wherein the identifier is positioned at an upper portion of each of the plurality of workpieces when each of the plurality of workpieces is in the predetermined direction.

10. The gripping apparatus according to claim 7, wherein the identifier is positioned at an upper portion of each of the plurality of workpieces when each of the plurality of workpieces is in the predetermined direction.

* * * * *